(No Model.)
A. BARNES & P. B. CUNNINGHAM.
COMBINED SHUTTER FASTENER AND SHUTTER BOWER.
No. 352,439. Patented Nov. 9, 1886.
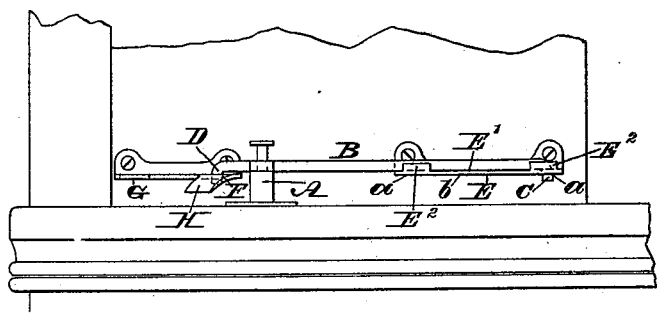
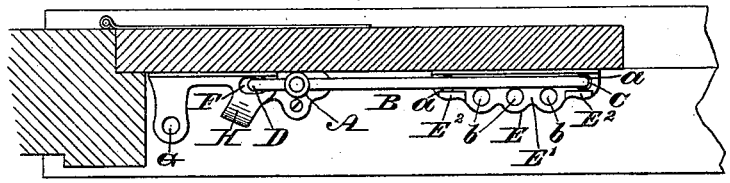
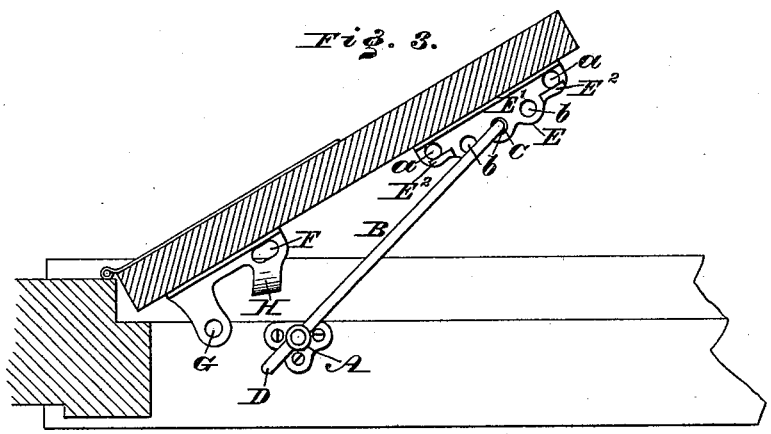
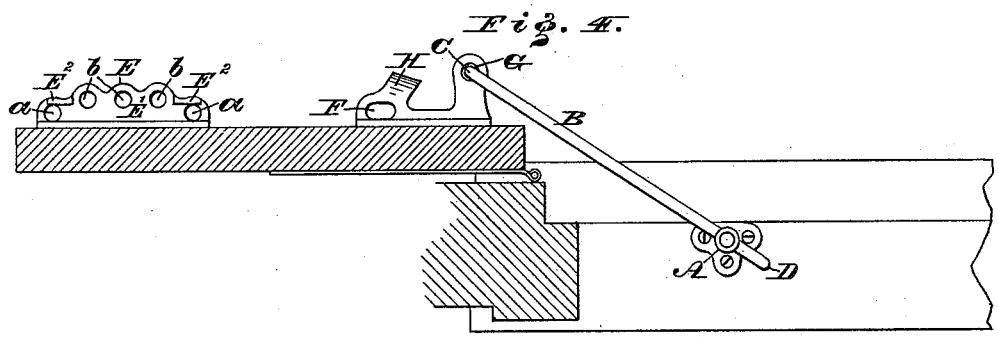
WITNESSES:
A. P. Grant,
L. Douville
INVENTORS:
Avon Barnes
Peter B. Cunningham
BY John A. Wiederscheim
ATTORNEY.

UNITED STATES PATENT OFFICE.

AVON BARNES AND PETER B. CUNNINGHAM, OF ALLENTOWN, PENNSYLVANIA, ASSIGNORS OF ONE-THIRD TO JACOB BARNES, OF SAME PLACE.

COMBINED SHUTTER-FASTENER AND SHUTTER-BOWER.

SPECIFICATION forming part of Letters Patent No. 352,439, dated November 9, 1886.

Application filed August 26, 1886. Serial No. 211,902. (No model.)

*To all whom it may concern:*

Be it known that we, AVON BARNES and PETER B. CUNNINGHAM, both citizens of the United States, residing at Allentown, in the county of Lehigh, State of Pennsylvania, have invented a new and useful Improvement in Shutter Fasteners and Bowers, which improvement is fully set forth in the following specification and accompanying drawings, in which—

Figure 1 represents a side elevation of a shutter fastener and bower embodying our invention, the shutter being in closed position. Figs. 2, 3, and 4 represent top views of the same respectively in closed, bowed, and open positions.

Similar letters of reference indicate corresponding parts in the several figures.

Our invention consists of a device for fastening and bowing shutters, as will be hereinafter fully set forth.

Referring to the drawings, A represents a post, which is secured to a window-sill, and B represents a bar or arm, which is freely fitted on said post so as to rise and fall thereon. The forward end of the arm B is formed with a nose, C, and the rear end thereof with a heel, D, both nose and heel extending in downward direction.

Secured to the inner face of the shutter, near the outer end thereof, is a perforated plate, E, and secured to said face, near the inner or hinged end of the shutter, are eyes F G, respectively, the eye F having an inclined lip, H, on which the heel D is adapted to ride when the shutter is in about a closed position, and thus elevate the arm B.

When the shutter is locked, the nose C occupies one of the openings of the plate E and the heel D occupies the eye F, whereby the arm B is prevented from turning on the post A, and the shutter is thus doubly locked by the plate E, eye F, and arm B with its nose and heel. By raising the arm the nose and heel leave their respective seats in the plate and eye, and the shutter may be opened.

When the shutter is bowed, the arm is swung out and its nose inserted in the proper opening of the plate E, as in Fig. 3, thus holding the shutter in bowed position.

When the shutter is opened to full extent, the nose of the arm is inserted in the eye G, and thus fastens the shutter in its open position.

To close the shutter the arm is raised clear of the eye G, or of the plate E if the shutter is in bowed position, and the shutter drawn in as usual, the arm being also drawn in. When the shutter is near the sill, the nose of the arm is placed on the plate E and the shutter drawn in to full extent. The heel then reaches the lip H and rides up the same, thus elevating the bar or arm B, and as the latter turns in with the shutter the nose and heel are brought over the respective opening of the plate E and the eye F, and then drop thereinto, whereby the arm is again locked, and the shutter is consequently secured or fastened.

The end openings, $a$, in the plate E, which receive the nose C when the shutter is closed, are set back from the intermediate openings, $b$, which receive said nose when the shutter is bowed, or, in other words, the rows of openings are in different lines. This provides a field or bearing, E', on which the bottom of the nose rides while closing or bowing the shutter, and causing the nose to drop into said end openings when it reaches the same.

Guards $E^2$ rise from the outer side of the plate adjacent to the end openings, serving to prevent an implement reaching the bar from the inner side of the plate should the shutter be bored through, and when the shutter is being closed from the outside the outer guard prevents the nose from displacement from the bearing E' as it approaches the outer end opening, $a$, and directs the nose into said opening.

Having thus described our invention, what we claim as new, and desire to secure by Letters Patent, is—

1. A shutter-fastener having a rising and falling arm, with a nose and heel at opposite ends, and a perforated plate and eye, with which the nose and heel engage, respectively, said eye having an inclined lip, on which the heel rides, so as to raise the arm and locate the nose and heel over the openings which they occupy in the locking position of the arm, substantially as described.

2. In a shutter fastener and bower, the combination of the arm B, having nose C, pivotally mounted on the post A of the window-sill, so as to permit a rising and falling motion of the said arm, the plate having perforations $a\ a$ and $b\ b$ in different lines on said plate, all substantially as and for the purpose set forth.

3. In a shutter fastener and bower, the arm with nose and heel, said arm being mounted on the post A, and having a rising and falling motion, in combination with the perforated plate E, having field E' and guard E², and piece with eyes F and G, and lip H, all substantially as and for the purpose set forth.

AVON BARNES.
    PETER B. CUNNINGHAM.

Witnesses:
 EDWARD RUHE,
 THOS. W. RUHE.